May 14, 1935.　　　C. T. WALTER　　　2,001,512
SLICING MACHINE
Filed Sept. 29, 1932　　　3 Sheets-Sheet 1
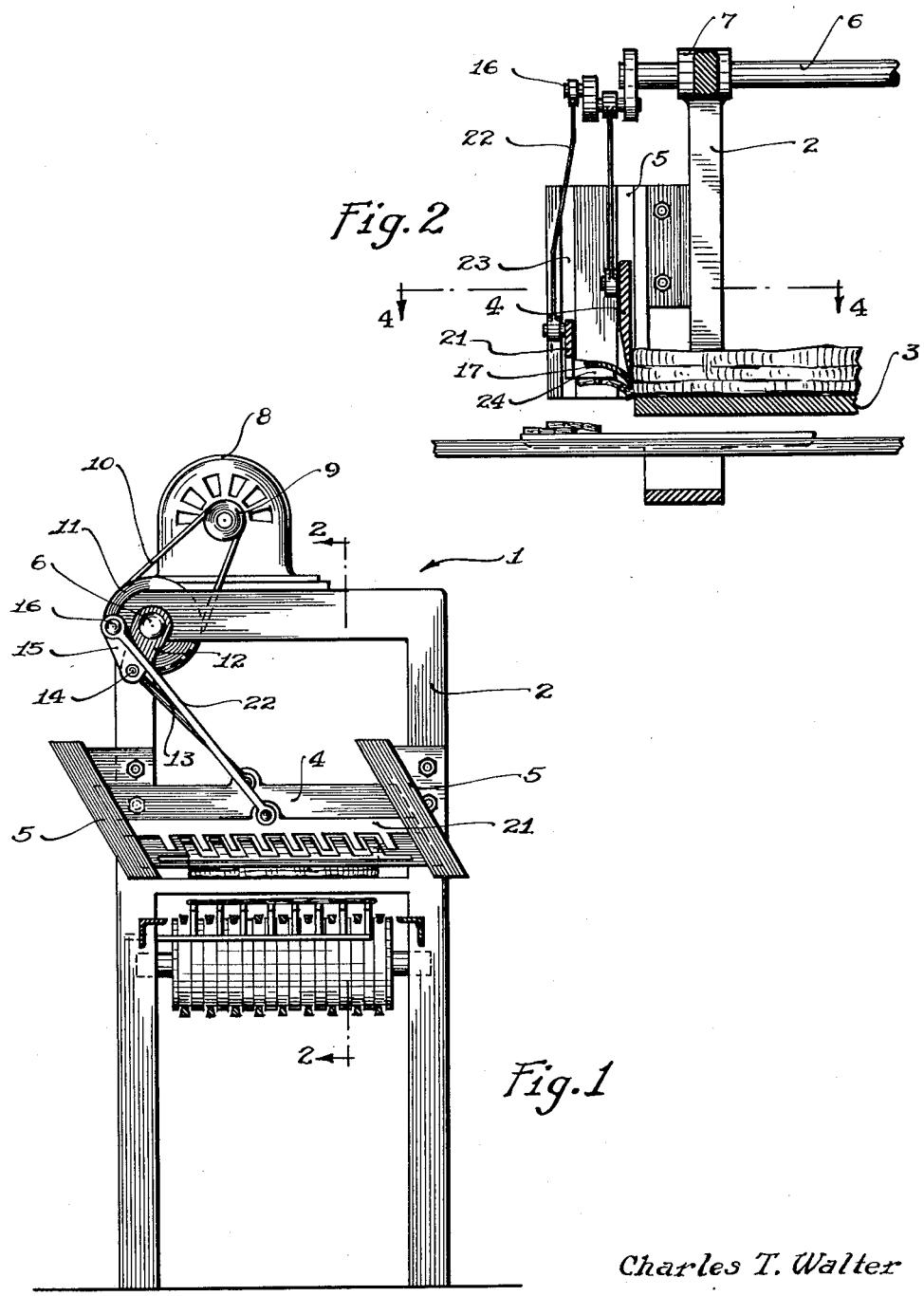
Charles T. Walter
INVENTOR May 14, 1935.  C. T. WALTER  2,001,512
SLICING MACHINE
Filed Sept. 29, 1932   3 Sheets-Sheet 3

Charles T. Walter
INVENTOR

WITNESS

Patented May 14, 1935

2,001,512

UNITED STATES PATENT OFFICE 2,001,512

SLICING MACHINE

Charles T. Walter, Chicago, Ill., assignor to Industrial Patents Corporation, Chicago, Ill., a corporation of Delaware Application September 29, 1932, Serial No. 635,382

21 Claims. (Cl. 146—159)

The invention relates to a slicing machine. The invention is particularly adapted for use in slicing machines designed for the cutting of strips of bacon into slices and from which machines the slices are collected in group or batch arrangement.

Heretofore bacon has been sliced on machines comprising a support by which or along which slabs of bacon are fed step by step to a transversely reciprocating cutter or knife by which the slices are cut one after the other and dropped upon a receiving table or suitable conveying mechanism. Experience has developed that it is not always certain that the slices thus severed and delivered will drop in uniform manner upon the receiving table or conveyor.

The present invention according to one aspect thereof revolves about the employment of a deflecting member which has been arranged for functioning at the forward or delivery side of the cutter. According to the present invention this deflector or deflecting member is upwardly concaved and arranged so that it extends upwardly and forwardly from the lower cutting portion of the cutter and so that as the slices are cut by a downward movement of the cutter they are gradually but easily deflected away from the knife and forwardly in respect to the knife whereby they can easily and uniformly drop, or can be caused to drop should any sticking occur, upon the receiving table or conveyor. This deflecting member may be made as an integral part of the knife structure or it can be assembled so as to in effect provide a composite structure of which the knife constitutes an important part.

The invention is applicable to a knife structure and arrangement in which the knife reciprocates to effect a cutting action solely by a shearing action without a drawing cutting action. In certain of the constructions shown and in the preferred embodiment of the invention it is utilized in conjunction with a knife construction which moves in a path inclined to the support upon which the product rests when being sliced, and the knife operates in such a manner that the cutting action by the knife is accomplished through the combined effect of a shearing action and a drawing cutting action. The deflector has a peculiar influence in connection with a knife thus operating because while the knife is having what might be termed its lateral or drawing cutting movement the deflecting plate also moves in the same lateral direction in reference to the partially severed slice with the result that there is relatively little chance for any extended adhering of the slice to the deflecting plate and on the other hand, there is a decided tendency to disrupt any adhering tendencies because of the lateral sliding as between the partially severed slice and the deflecting plate which is moving laterally as well as downwardly.

A further aspect of the invention relates to the construction of the deflecting plate with ejector receiving openings and to the employment with ejector plates thus constructed of ejector means or members which enter and pass sufficiently through the ejector openings to positively remove or eject any adhering slices from the deflector plate and which also functions to cause or insure a delivery of the slices in a uniform arrangement to and upon a receiving table or conveyor which is located below the ejector plate, or in other words, which is located at and near the forward delivery end of the slicing machine.

As illustrating certain specific manners in which the invention may be realized, reference is made to the accompanying drawings forming a part of this specification, and in which drawings:—

Figure 1 shows an end elevation or front view of a bacon slicing machine employing a knife or cutter of the reciprocating type running in inclined guides.

Fig. 2 shows a vertical, longitudinal, sectional view taken as on the line 2—2 of Fig. 1.

From these figures it will be apparent that the slicing machine comprehends a longitudinally and forwardly extending means whereby slabs of meat, such as bacon, can be fed forwardly to the reciprocating knife which is located at the forward end of the machine; that the apparatus as a whole comprises a longitudinally extending endless conveyor located so as to receive slices of bacon as ultimately delivered thereto. However, in Figs. 1 and 2, it will be noted that there is provided an intermediate receiving and delivering member or table that is arranged under the delivery section of the knife in such a manner as to receive the slices that are delivered thereupon by the knife and the function of this intermediate member is to deliver the slices properly arranged thereupon to and upon the endless conveyor mentioned.

In Figs. 1 and 2 it will also be noted that the knife is provided at the forward or delivery side thereof with an upwardly concaved deflecting member which extends upwardly and forwardly from the lower edge portion of the knife and that there is associated with this deflecting member an ejector element or member that serves to positively eject slices severed by the knife so that they will drop upon the intermediate receiving and delivering member just referred to, in a relatively uniform degree of regularity. The deflector of Figs. 1 and 2 provides a comb-like structure or element.

Figure 3:
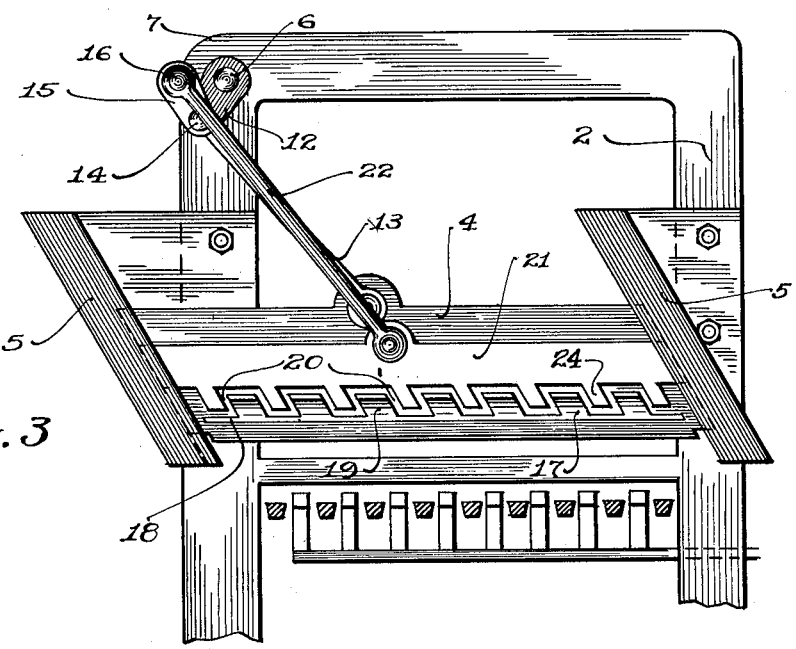

Fig. 3 is an enlarged view of the knife and comb arrangements, the endless conveyor elements and of the intermediate receiving and delivery member previously referred to.

Figure 4:
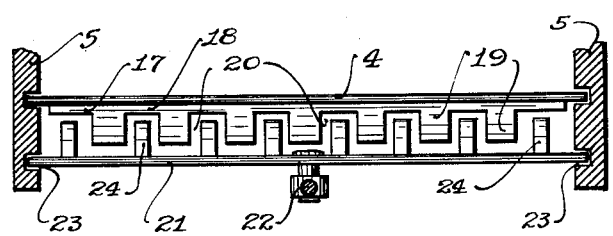

Fig. 4 is a horizontal sectional view taken as on the plane indicated by the lines 4—4 of Fig. 2. Fig. 4 is incorporated primarily to show the relative arrangement of the deflecting member or deflecting comb-shaped member on the one hand, and the ejecting member having fingers or prongs that extend into the receiving spaces provided between the teeth of the comb, on the other.

Figure 5:
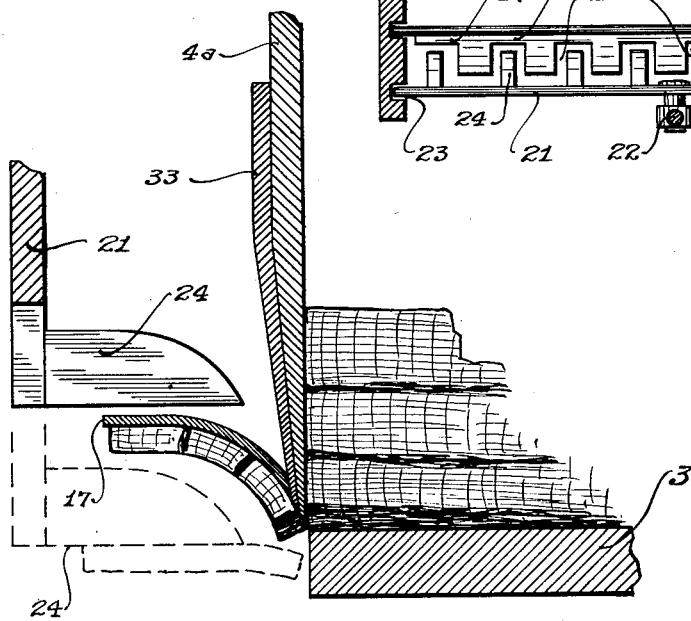

Fig. 5 is a vertical, longitudinal, sectional view on a somewhat larger scale than shown in Fig. 2, showing primarily a knife, a deflecting member, and the ejector member in associated relationship in respect thereto. A portion of the ejector is shown in the upper full line position and in the lower dotted line position. The knife and the deflector construction associated therewith are somewhat different in Fig. 5 from the showing of Fig. 2.

Figure 6:
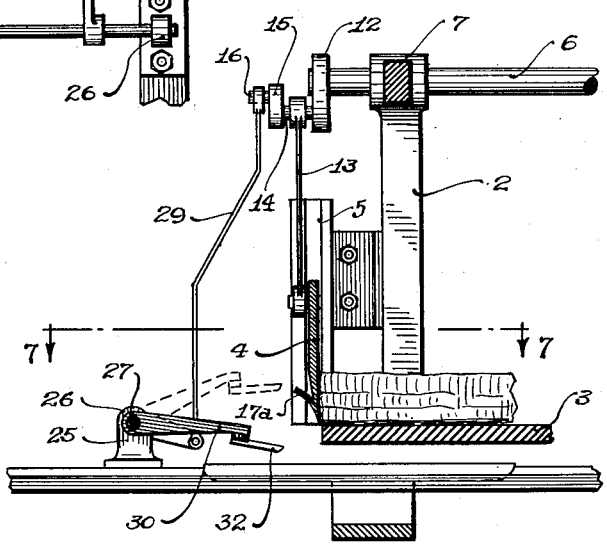

Fig. 6 is an arrangement somewhat different from that shown in Fig. 2 but the principle embodied in Fig. 6 is substantially that of Fig. 2. In other words, in Fig. 6 there is shown the forward end of a slicing machine, a reciprocating knife, a deflector associated and movable with the knife, and ejector mechanism that is operatively associated with the knife so as to move in certain timed relationship in respect thereto. The ejector of Fig. 6, however, is somewhat different as to detail construction from that shown in Fig. 2.

Figure 7:
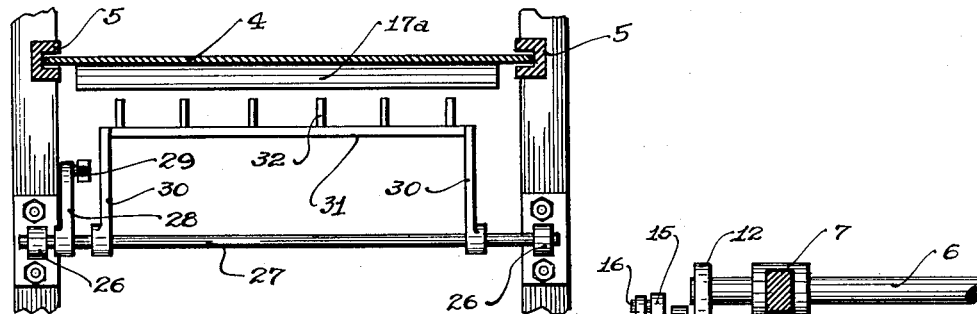

Fig. 7 is a plan view taken on the plane indicated by the line 7—7 of Fig. 6, Fig. 7 being primarily incorporated to illustrate the construction of the ejecting mechanism of Fig. 6.

Figure 8:
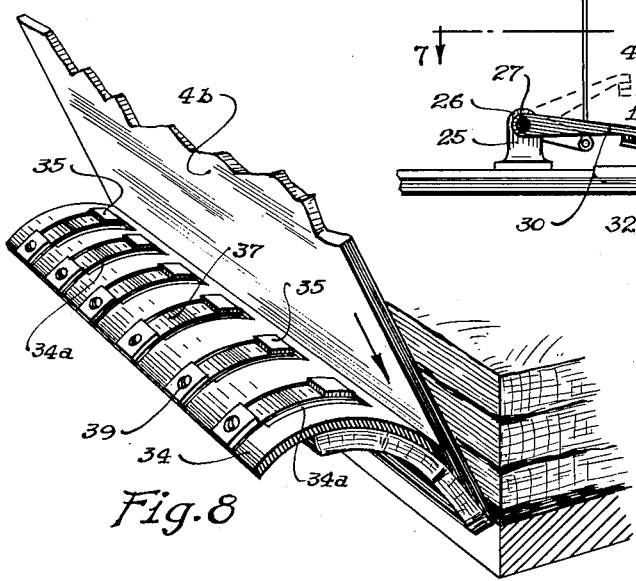
Figure 10:
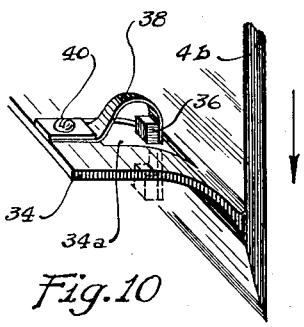
Figure 9:
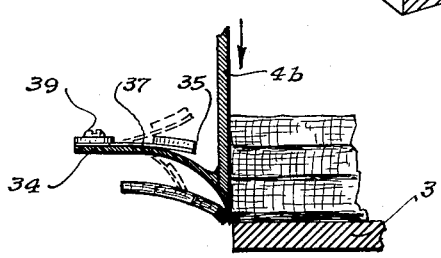

Figs. 8, 9 and 10 illustrate a still further form of deflector plate used with the cutting knife and ejector mechanisms employed in association therewith.

Reference will now be made to the drawings in detail. I represents a slicing machine as a whole, or at least a part of the slicing machine that comprehends the main frame structure 2 upon and by which the several functioning parts of the slicing machine are properly mounted. In the intermediate portion of the main frame 2 there is secured any suitable supporting means or feeding table indicated by 3, upon and along which slabs of meat, such as bacon, are fed in a longitudinal forward direction to a reciprocating member 4. This reciprocating member or cutter carrying member 4 is mounted in inclined guideways 5 so that the cutter 4 can be moved therealong with the result that the cutter effects not merely a shearing cutting action but also a drawing cutting action as in a lateral direction because of the inclined or lateral movement of the cutter as it approaches the slab supporting member which extends horizontally in both a longitudinal and transverse direction.

The frame 2 carries a main drive shaft 6 mounted in suitable bearings 7 on the frame and this shaft 6 is continuously driven in any suitable manner as from the motor 8 that is mounted on the main frame through the medium of chain drive gearing that comprehends a gear 9, chain 10, and gear 11. The main shaft 6 carries at the forward end thereof a main crank or cutter operating crank 12 which is connected to the cutter carrying member 4 in any suitable manner as by means of the connecting rod 13 whereby as the shaft 6 rotates the cutter carrier 4 is reciprocated up and down along the inclined path towards and from full cutting position. The shaft 6 through the medium of the main crank 12 and crank pin 14 upon which the upper end of the connecting rod 13 is mounted, serves to support a secondary crank or ejector operating crank 15 having crank pin 16 which in turn serves to operate the ejector mechanism hereinafter described. This secondary crank pin 16 may be referred to as the ejector operating crank. There has just been described in a general way how the cutter knife is operated on the one hand and how the ejector mechanism is operated on the other.

Attention is now temporarily diverted from this general description to the knife construction and the deflector member associated therewith. In Figs. 1, 2 and 3 there is shown in association with the knife or knife carrying member 4 a concave deflecting plate 17 which in Fig. 2 and also in Fig. 6, is shown as integral with the knife structure. Whether integral or not, an important feature of the deflector construction is that it shall have a close association with the knife whereby the deflector will be located entirely in front of the knife structure but so that it will extend from near the lower cutting edge of the knife upwardly, thence forwardly along the curved path shown, whereby as the knife functions to effect a cutting operation the slices of bacon will be deflected forwardly and outwardly as the cutter moves downwardly. Attention is also called to the fact that with the knife traveling along the inclined guideways whereby it has a general lateral or transverse movement in respect to the slab of bacon being sliced that these deflecting members will also have a lateral sliding movement in respect to the slice as it is being severed. This deflecting member 17 is made up, as for example, of a longitudinally extending bar portion 18, that may be integrally connected to the knife or that may be fixedly secured in respect to the knife, but adjacent thereto, and a transversely spaced series of comb teeth or transversely spaced elements 19 that provide ejector receiving spaces 20 between the teeth 19. In other words, these upwardly and forwardly projecting comb teeth, in effect, collectively constitute the deflector or deflecting member at the front of the knife.

Reverting now to the ejector mechanism it will be noted that this comprises a reciprocating bar or carrier 21 (see Figs. 1, 2 and 3) which is operated from the secondary or ejector crank pin 16 through any suitable means, as for example, the connecting rod 22. The reciprocating bar 21 slides in the inclined guideway members 23 provided therefor. The reciprocating bar 21 carries a series of transversely spaced ejector members in the form of fingers or prongs 24 which extend rearwardly a sufficient distance to enter the receiving spaces 20 therefor, between the comb teeth 19 of the deflecting member 17.

In the construction of Figs. 1 to 3 it will be observed that the ejector mechanism that comprises the bar 21 is slidably supported in the same member that provides the guideways for the cutter carrying member or element 4. It is feasible, however, to mount the ejector mechanism on a structure which is independent of or other than that which provides the guideways for the cutter carrier and such a modified form is shown in Figs. 6 and 7. The construction of Figs. 6 and 7 is substantially the same as that described in connection with Figs. 2 and 3 with the exception that in Figs. 6 and 7 a bearing standard 25 is mounted on suitable members rigidly connected with the frame of the machine and provides bearings 26 for opposite ends of the transversely extending shaft 27.

The transversely extending shaft 27 has an arm 28 thereupon, the free end of which is operatively connected to the secondary or ejector crank pin 16 as through the medium of a connecting rod 29 so that angular movement can be imparted to the shaft 27 as the crank pin 16 is caused to revolve by the turning movement of the main shaft 6. The shaft 27 carries other rearwardly extending arms 30, at the free ends of which there is mounted an ejector bar 31 from which there forwardly projects a series of spaced ejecting fingers or prongs 32 that are arranged to engage slices of bacon as they pass the deflector plate in a manner whereby each slice is positively directed towards the intermediate receiving member arranged to receive it. It will be also noted that the deflecting member 17ª of Fig. 6 is somewhat shorter than is the deflector of deflecting member of Fig. 2. However, the length of the deflecting plates and the specific construction thereof are largely a matter of choice, depending upon the manner in which one desires to employ the deflecting means and the ejector mechanism in association therewith.

In the arrangement of Fig. 5 the deflector functions substantially the same as does the deflector of Fig. 2 but it will be seen that according to the construction of Fig. 5 the deflector is provided by and carried on an auxiliary plate 33 which is closely positioned in respect to the cutter 4ª with which the slicing machine may be provided.

While according to certain aspects of the invention it is contemplated that the deflectors may be provided integral with the cutting knife, still according to the broader and general aspects of the invention it is contemplated to employ a deflecting element which has a member independent of and distinct from the knife even though operatively positioned and associated in respect thereto. It is important, however, that there be a smooth unobstructing surface from the cutting edge of the knife to and along the deflector construction. In Fig. 5 the deflector is shown as carried on a member 33 which is independent of but closely positioned in respect to the knife 4ª with which the deflector is associated so as to operatively function as the knife moves downwardly. In said figure the ejector member 21 with the ejector fingers 24 thereupon are shown in full line position just previous to the ejecting operation being carried out while in this same figure in the dotted line position there is indicated the manner in which the ejector affects the ejecting action in respect to the slice of bacon just last cut.

In Figs. 8, 9 and 10 there is illustrated a deflecting member 34 in association with the knife 4ᵇ thereof, and it will be observed that the deflector member 34 instead of being comb-shaped, is provided with a series of transversely arranged slotted portions designated by 34ª. These slotted portions provide spaces for receiving certain members of the ejectors and for permitting the certain members of the ejectors to pass therethrough in order to effect a positive ejecting of the bacon slices and in the construction of these Figs. 8 to 10, there is contemplated the employement of weights 35 or 36 as ejecting members which are mounted on the free ends of resilient or spring supports 37 or 38, as the case may be.

These springs are fixed at one end and secured in place in reference to the deflector plate as through the medium of screw connections provided as at 39 and 40. The functioning effect of the structures of Figs. 9 and 10 is substantially the same although it will be noted that the springs 37 and 38 thereof are of slightly different formation and arrangement. In the operation of the knife as shown in Figs. 8 to 10 it will be noted that during the downward or cutting movement of the knife the weights as 35 or 36, as the case may be, tend to occupy their uppermost position, but when the knife movement is reversed the inertia of the weights tends to effect a downward movement of the weights relative to the deflector with the result that this downward movement of the weights into and through the ejector receiving spaces accomplishes a positive ejecting of the bacon slice as the cutter moves upwardly. In respect to the constructions such as illustrated in connection with Figs. 2, 5 and 6 and also in connection with the construction shown in Figs. 8 to 10, it will be observed that the ejector mechanisms are not functioning during the downward movement of the cutter. By that there is meant that these ejector mechanisms are not functioning to actually effect ejecting of the bacon slices. However, in all forms of construction illustrated, upon the upward or return movement of the cutter or knife the ejector mechanisms or the ejector fingers, prongs or weights thereof, come into play in a manner whereby the fingers or prongs which are the active ejecting elements, parts or members, move into and through the ejector receiving passageways or at least in respect to the deflector in such a manner that there is effected a positive ejecting or moving of the deflected bacon slices from the deflectors downwardly to the receiving table or conveyor below the same.

In short, the functioning of the deflecting element is to cause bacon slices to assume a curved and more or less horizontal position by the time it is completely cut from the bacon slab. This curving away from the knife makes it possible for the ejecting fingers or members to act upon the upper surface of the bacon slice and force it downwardly to the conveyor or receiving means with a more or less uniform degree of regularity.

What is claimed is:

1. In a slicing machine, a reciprocating knife, means for reciprocating the same, means whereby to feed meat products to be sliced forwardly towards and under the cutting influence of the reciprocating knife, a deflecting member associated with the knife and located at the forward side of the knife and extending upwardly from adjacent the cutting edge of the knife and gradually forwardly and from the knife so as to gradually deflect forwardly from the knife that portion of the slice which progressively engages the deflecting member, said deflecting member being constructed so as to provide passageways for ejecting members that function to move through the passageways, and means associated with the knife moving mechanism in such a manner that as the cutter operates to sever a slice the ejector means does not function to perform any ejector effect but such that when the cutter or knife is on its return stroke the ejector mechanism functions to enter the passageways and to thereby positively remove from the deflector plate or member the slice last cut.

2. In a slicing machine a longitudinally, horizontally and transversely extending supporting table, a cutter that reciprocates in a vertically and transversely extending cutting plane, means for guiding said cutter so that it moves along a transversely extending laterally inclined path, whereby as the cutter functions to effect the cutting operation it accomplishes the same by combined shearing and drawing cutting operations, and an upwardly and forwardly directed deflecting surface of a length substantially the same as the width of said cutter and provided by a member leading upwardly and forwardly to a substantially horizontal plane from adjacent the cutting edge section of the cutter, which deflecting member moves along a transversely extending laterally inclined path as determined by the knife movements.

3. A combination such as described in the claim last preceding according to which the deflecting member is provided with ejector receiving openings and which deflecting member has associated therewith ejector means that operate in synchronism with the cutting movements in such a manner that after a slice has been severed from a slab of bacon the return movement of the cutter is accompanied by the ejector mechanism functioning in such a manner that the ejector members thereof passes into and sufficiently through the ejector receiving openings in the deflecting member to effect a positive ejecting of the slice should the slice tend to adhere to the deflecting members.

4. In a slicing machine a supporting table, a cutter, members inclined in respect to the supporting table and providing inclined guideways for a reciprocating cutter carrying member, the cutter carrying member slidably mounted in said guideways, deflecting means provided by upwardly extending and forwardly curving members which are relatively fixedly associated with the knife when the knife carried in the cutter carrying member whereby there is provided and movable with the knife forwardly curved deflecting members having ejector passageways between them, an ejector mechanism comprising spaced ejecting members arranged so that they can enter the ejector passageways in such a manner that the ejector members can operate in relatively vertical paths, a main drive shaft, a crank carried by said main drive shaft and connecting means whereby from said crank the cutter carrying member can be reciprocated towards and from the supporting table for effecting successive cutting operation, a second crank driven by said main shaft and connecting means extending from said second crank to the ejector mechanism in such a manner that during the downward movement of the cutter the ejector members are held in elevated position in respect to the deflector plate but so that as the cutter carrying member is moved upwardly the ejector mechanism functions to move the ejector members downwardly in respect to the deflector plate sufficiently to positively eject and deliver from the deflecting plate each slice whereby the severed slices will successively drop in the proper position upon a delivery conveyor leading from the machine.

5. In a slicing machine, a knife, means for reciprocating the same, means for feeding meat products to be sliced forwardly towards and under the cutting influence of the reciprocating knife, a deflecting member associated with the knife and located at the forward side of the knife and extending upwardly from adjacent the cutting edge of the knife and also extending gradually forwardly from the knife, said deflecting member being constructed so as to provide passageways for ejector parts that function to enter the passageways, and means associated with the knife moving mechanism in such a manner that as the cutter operates to sever a slice the ejector means does not function to perform any ejector effect but in such a manner that when the cutter or knife is on its return stroke the ejector parts function to enter the passageways and to thereby positively remove from the deflecting plate or member the slice last cut.

6. A slicing machine having in combination a cutter that reciprocates in a transversely extending cutting plane, forwardly and upwardly directed deflecting means providing spaced portions that lead upwardly from adjacent the cutting edge section of the cutter and forwardly in respect to the cutter, and ejector means having movable members that cooperate with the deflecting means and which enter the spaces provided between the spaced portions of the deflecting means.

7. In a slicing machine, a reciprocating knife, means for reciprocating the same, means for the feed of meat products forwardly to the knife to be sliced, means for conveying the cut slices away from the knife, a deflecting member operatively associated with the knife and disposed between the latter and said conveying means to change the position of each slice from a vertical plane gradually to a substantially horizontal plane as the slice is being cut, and means above the deflecting member to coact with the deflecting member and operable when the cut slice has been deflected to said substantially horizontal plane to contact with the upper surface of the cut slice and direct the same rapidly away from the deflecting means to said conveying means.

8. In a slicing machine, a reciprocating knife, means for reciprocating the knife, means for the feed of meat products forwardly to the knife to be sliced, means for conveying the cut slices away from the knife, and means to control the course of travel of the slices from the time the knife starts to cut the product until completion of the slicing operation and each slice transferred to said conveying means in overlapping relation to other slices, including a deflecting member associated with the knife to change the position of each slice from a vertical plane gradually to a horizontal plane as each slice is being cut, and means above said deflecting member and operable when the cut slice has been deflected to said substantially horizontal plane to engage the cut slice at the upper face thereof to direct the same rapidly away from the deflecting means to said conveying means, one slice after another and into overlapping relation with one another on the conveying means.

9. In a meat slicing machine, a reciprocating knife, means for reciprocating the same, means for the feed of meat products forwardly to the knife to be sliced, a deflecting member operatively associated with the knife to change the position of each slice from a vertical plane gradually to a substantially horizontal plane as the slice is being cut, means to receive the cut slices one after another from the deflecting member, and means operable to engage the successively cut slices and direct them to said receiving means.

10. In a meat slicing machine, a reciprocating knife, means for reciprocating the same, means for the feed of meat products forwardly to the knife to be sliced, a deflecting member operatively associated with the knife to change the position of each slice from a vertical plane gradually to a substantially horizontal plane as the slice is being cut, a conveyor under the deflecting member and leading forwardly of the machine to receive the cut slices one after another from the deflecting member, and means above the deflecting member and operable to engage the successively cut slices and direct them one after another into overlapping relation with one another on the said conveyor.

11. In a slicing machine, a reciprocating knife, means for reciprocating the same, means for the feed of meat products to the knife to be sliced, a deflecting member associated with the knife so as to control the course of travel of the slice as it is being cut from the time the knife starts to cut the product to change the position of each slice from a vertical plane gradually to a substantially horizontal plane as the slice is being cut, means to receive the cut slices from the deflecting member, and a device operable as the slice is being completely severed to engage the slice on the deflecting member to remove the slice from the latter for reception by said receiving means.

12. In a meat slicing machine, the combination with means for supporting a slab of meat and a reciprocating cutting element, of a deflecting member of substantially the same length as the width of the cutting element and disposed forwardly of the cutting element and operable to deflect the slice of meat as it is being cut from the slab gradually upwardly and forwardly of the cutting element against the under face of the deflecting member, and means for removing the cut slice from the deflecting member.

13. In a meat slicing machine, the combination with means for supporting a slab of meat, of a combined cutting element and a deflecting member of substantially the same length as the width of the cutting edge of the cutting element and directed forwardly of the cutting element and operable by and with the cutting element to deflect the slice of meat as it is being cut from the slab gradually upwardly and forwardly of the cutting element against the under face of the deflecting element, means for receiving the cut slice from the under face of the deflecting element, and means for effecting a separation of the slice from the deflecting member for reception by said receiving means.

14. In a meat slicing machine, the combination with means for supporting a slab of meat and a reciprocating cutting knife, a deflecting member associated with the cutting knife and having a smooth under surface projecting upwardly and forwardly of the knife to direct each slice of meat as it is being cut slidably upwardly and forwardly of the knife gradually over said under face of the deflecting member, and means operable upon the cut slice, after complete separation of the same from the slab, to eject the cut slice from the deflecting member.

15. In a meat slicing machine, the combination with means for supporting a slab of meat and a reciprocating cutting knife, a deflecting member associated with the cutting knife and having a smooth under surface projecting upwardly and forwardly from the cutting edge of the knife to direct each cut slice upwardly and forwardly of the knife gradually over the under face of the deflecting member as the knife moves downwardly to complete the cutting operation, and means to engage the upper face of the cut slice to remove it from the deflecting member as the knife moves upwardly, and means to receive the cut slices from the deflecting member.

16. In a slicing machine, a reciprocating knife, means for reciprocating the same, means for the feed of meat products to be sliced forwardly to the knife, a deflecting member associated with the knife at the forward side of the latter to change the position of the slice as it is being cut from a vertical plane to a substantially horizontal plane forwardly of the knife, and a reciprocating ejecting means operatively connected with the knife reciprocating means for actuation after completion of the cutting operation and upon return stroke of the knife to engage and remove the completely severed slice from the deflecting member.

17. In a slicing machine, a reciprocating knife, means for reciprocating the same, means for the feed of meat products to be sliced forwardly to the knife, a deflecting member associated with the knife at the forward side of the latter to change the position of the slice as it is being cut from a vertical plane to a substantially horizontal plane forwardly of the knife, and a reciprocating ejecting means operatively connected with the knife reciprocating means for actuation after completion of the cutting operation and upon return stroke of the knife to engage and remove the completely severed slice from the deflecting member, the connections of the knife and the ejecting means with the knife reciprocating means being such that the length of stroke of the latter is greater than the length of stroke of the former so that the lowermost position of the ejecting means may be lower than the lowermost position of the cutting edge of the knife.

18. In a slicing machine, a reciprocating knife, means for reciprocating the same, means for the feed of meat products to be sliced forwardly to the knife, a deflecting means associated with the knife at the forward side of the latter to effect movement of each slice as it is being cut forwardly away from the knife, a conveyor means below the deflecting means, and reciprocating ejecting means arranged above the deflecting means and operatively connected to the knife reciprocating means in a manner to be maintained above the deflecting means until complete severance of a slice from the meat and then immediately operative to move downwardly into engagement with the cut slice to transfer the same from the deflecting means to said conveyor means.

19. In a meat slab slicing machine, the combination with means for the feed of a slab of meat, a cutting element, and a receiving means for cut slices of the slab, of means to control the motion of a cut slice from the slab from the time the knife starts to cut it from the slab until it comes to rest on the receiving means, including a deflecting member carried by the knife to deflect and move the slice as it is being cut to a substantially horizontal slightly curved position, and an ejecting means operable from above the deflecting member to engage the cut slice to transfer the same to said receiving means.

20. In a slicing machine, a longitudinally and transversely extending supporting table, a cutter that reciprocates in a transversely extending cutting plane, means for guiding said cutter so that it moves along a transversely extending laterally inclined path, whereby as the cutter functions to effect the cutting operation it accomplishes the same by combined shearing and drawing cutting operations, an upwardly and forwardly directed deflecting surface provided on and by a member leading upwardly and forwardly from adjacent the cutting edge section of the cutter and of a length substantially the same as the width of said knife, the member that provides said deflecting surface being provided with ejector receiving openings and movable along a path according to which the deflecting member has forward and transverse sliding engagement with the slice being severed, and ejector means employed with said deflecting member that operate in accordance with the cutting movements for effecting an ejector action as the cutter moves from its full cutting position.

21. In a slicing machine, a longitudinally and transversely extending supporting table, a cutter that reciprocates in a transversely extending cutting plane, spaced upwardly and forwardly directed deflecting portions that lead upwardly from adjacent the cutting edge section of the cutter and extend forwardly in respect to the cutter substantially throughout the length of the cutter, which deflecting portions have forward and transverse sliding engagement with a back face portion of a slice being severed by the knife, and ejector means having members that enter the spaces between the spaced deflecting portions.

CHARLES T. WALTER.